UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

SULFONATED ANTHRAQUINONE DYE.

SPECIFICATION forming part of Letters Patent No. 656,081, dated August 14, 1900.

Application filed May 15, 1900. Serial No. 16,795. (No specimens.)

*To all whom it may concern:*

Be it known that I, OSCAR BALLY, doctor of philosophy, a citizen of the Swiss Republic, residing at Mannheim, in the Grand Duchy of Baden, Germany, have invented new and useful Improvements in the Manufacture of Sulfonated Anthraquinone Dye, of which the following is a specification.

It is known that if anthraquinone-mono-sulfoacid be nitrated by treatment with a mixture of nitric and sulfuric acid mono-nitro-anthraquinone-mono-sulfoacids are obtained. Of these one, called the "alpha" acid, is with difficulty soluble in water. The other, more readily soluble, is called the "beta" acid.

My invention consists in the production of a new coloring-matter group from the said nitro-anthraquinone-sulfoacids. The said coloring-matters are obtained by melting the mono-nitro-anthraquinone-sulfoacids with aromatic amins, and it appears probable that the reaction that takes place consists in replacing the nitro group by a corresponding alphyl-amin residue, and the new coloring-matters may be regarded as mono-alphyl-mono-amido-anthraquinone-mono-sulfoacids. They dye wool that has been mordanted with chrome or unmordanted wool, yielding red, violet, or brown shades. They are generically characterized by the following properties: They are soluble in water, soluble in dilute sodium-carbonate and sodium-hydrate solutions, but are precipitated by an excess of either of these reagents. They are also soluble in alcohol and in concentrated sulfuric acid. The coloring-matter of my new group which I desire to claim specifically is that obtained from beta-nitro-anthraquinone-mono-sulfoacid and para-toluidin. It yields a violet solution in water, red violet in dilute sodium carbonate, violet in dilute caustic soda, but which is precipitated from its aqueous solution by more of either of these reagents. It is soluble in alcohol, giving a bluish-cherry-red solution, and in concentrated sulfuric acid it yields a brown solution. It dyes chrome-mordanted wool a bluish-bordeaux color.

The following example will serve to illustrate my invention and the manner in which it can be carried into effect and my new product obtained. Melt about one hundred (100) parts of para-toluidin in a vessel provided with a stirrer and add about ten (10) parts of the beta-nitro-sulfoacid. Heat the mixture till it boils and continue heating until the melt has assumed a cherry-red color which no longer increases in intensity. To isolate the new coloring-matter, allow the melt to cool to about 80° centigrade, then add about one hundred and fifty (150) parts of alcohol and allow to cool. A precipitate forms, which consists of any unchanged nitro-sulfoacid and some coloring-matter. Filter this off from the alcoholic mother-liquid and precipitate the pure coloring-matter from this by adding twice its volume of ether. The coloring-matter obtained in this way is a brown-violet crystalline powder. Separate the coloring-matter from the mother-liquor by decanting and filter. In a similar manner the new color can be obtained from the alpha-nitro-anthraquinone-sulfoacid and also from both the nitro-sulfoacids and other aromatic amins instead of para-toluidin. If desired, the conditions of the reaction can be varied. Diluents, such as naphthalene, can be used and the coloring-matter can be isolated from the melt in other ways.

Now what I claim is—

1. The new coloring-matter mono-alphyl-mono-amido-anthraquinone-mono-sulfoacid which can be obtained by treating mono-nitro-anthraquinone-sulfoacid with an aromatic amin and which is soluble in water, soluble in dilute sodium-carbonate and in sodium-hydrate solutions but precipitated by an excess of these reagents, soluble in alcohol and in concentrated sulfuric acid, all substantially as described.

2. The specific new coloring-matter which can be obtained by treating beta-mono-nitro-anthraquinone-sulfoacid with para-toluidin and which yields a violet solution in water, and dissolves in dilute sodium-carbonate solution giving a red-violet color and in dilute caustic-soda solution giving a violet color but which is precipitated from its aqueous solution by an excess of the reagents, soluble in alcohol giving a bluish-cherry-red solution and in concentrated sulfuric acid giving a brown solution, all substantially as described.

In testimony whereof I have hereunto set my hand in the presence of two subscribing witnesses.

OSCAR BALLY.

Witnesses:
J. L. HEINKE,
PERCY J. JONES.